United States Patent [19]

Weber et al.

[11] 4,376,373
[45] Mar. 15, 1983

[54] ENERGY RECOVERY SYSTEM

[76] Inventors: Roy Weber, P.O. Box 336; Bruce C. Huddleston, 865 N. Kalaheo Ave., both of Kailua, Oahu, Hi. 96734

[21] Appl. No.: 235,489

[22] Filed: Feb. 18, 1981

[51] Int. Cl.³ .............................................. F01K 17/00
[52] U.S. Cl. ..................... 60/648; 110/235; 122/2
[58] Field of Search .............. 60/648; 110/235; 122/2, 122/7 R

[56] References Cited

U.S. PATENT DOCUMENTS

| | | | |
|---|---|---|---|
| 1,041,810 | 10/1912 | Kitchen | 60/648 |
| 3,606,847 | 9/1971 | Reilly | 122/2 X |
| 3,917,239 | 11/1975 | Rhinehart | 110/235 X |
| 3,965,362 | 6/1976 | Harvey | 60/648 X |

*Primary Examiner*—Allen M. Ostrager
*Assistant Examiner*—Stephen F. Husar
*Attorney, Agent, or Firm*—James Creighton Wray; Craig B. Bailey

[57] ABSTRACT

Scrap automobiles are loaded onto carts which move along rails into a two-stage incinerator. Combustible waste is shredded, dried, and loaded onto a transporter which moves along the rails into the incinerator. The automobiles and combustibles are incinerated and the heat produced is collected. The heat is converted into steam used to power a turbine driven electricity generator. The generated electricity is used to electrolyze water and to operate an electric arc furnace which refines the incinerated metal. Heat from the incinerator is further used to heat waste oil in a cracking tower and to heat fermented organic waste in an alcohol still. The combustion gases are passed through a scrubbing tower where they are cooled and scrubbed with a caustic spray to neutralize acids present and they are passed through a bag house filter to remove particulate matter before they are vented into the atmosphere.

66 Claims, 13 Drawing Figures

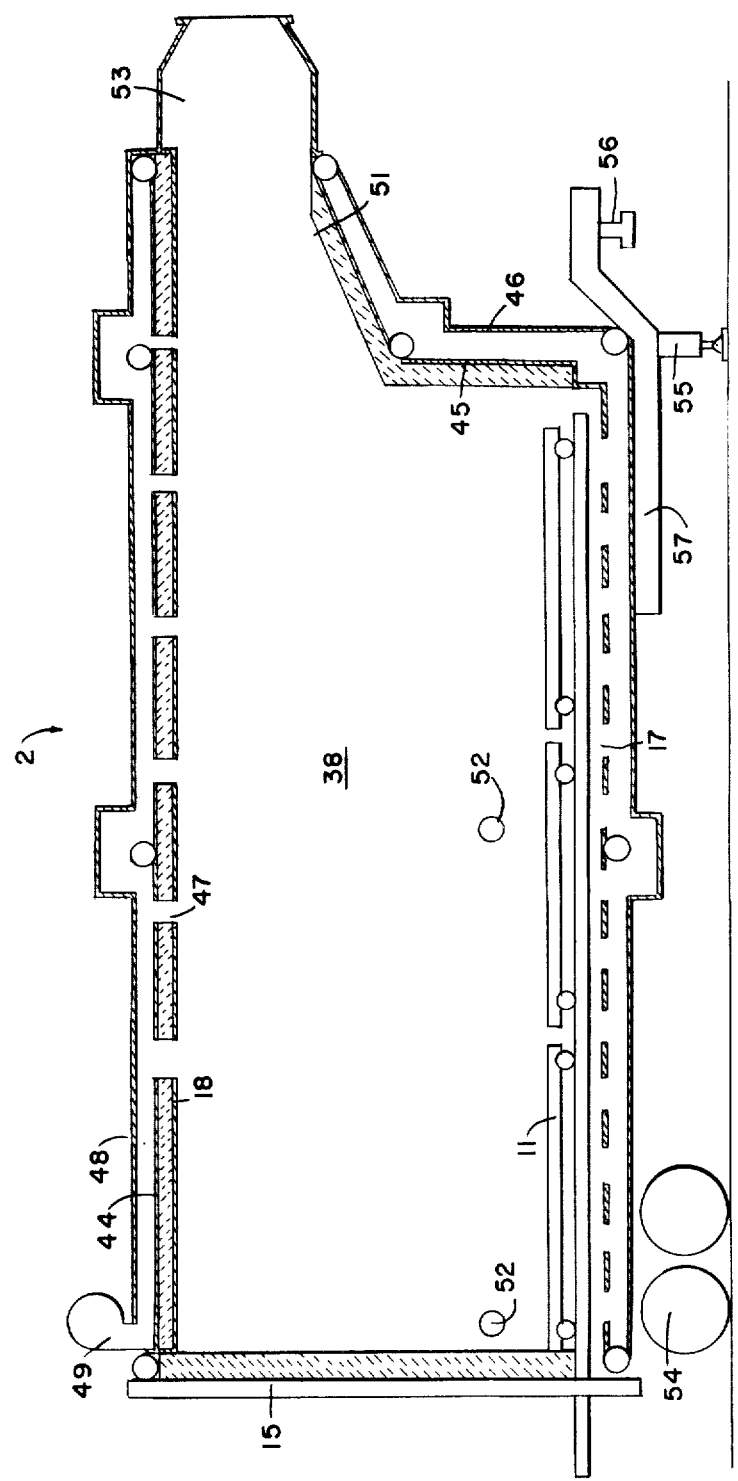

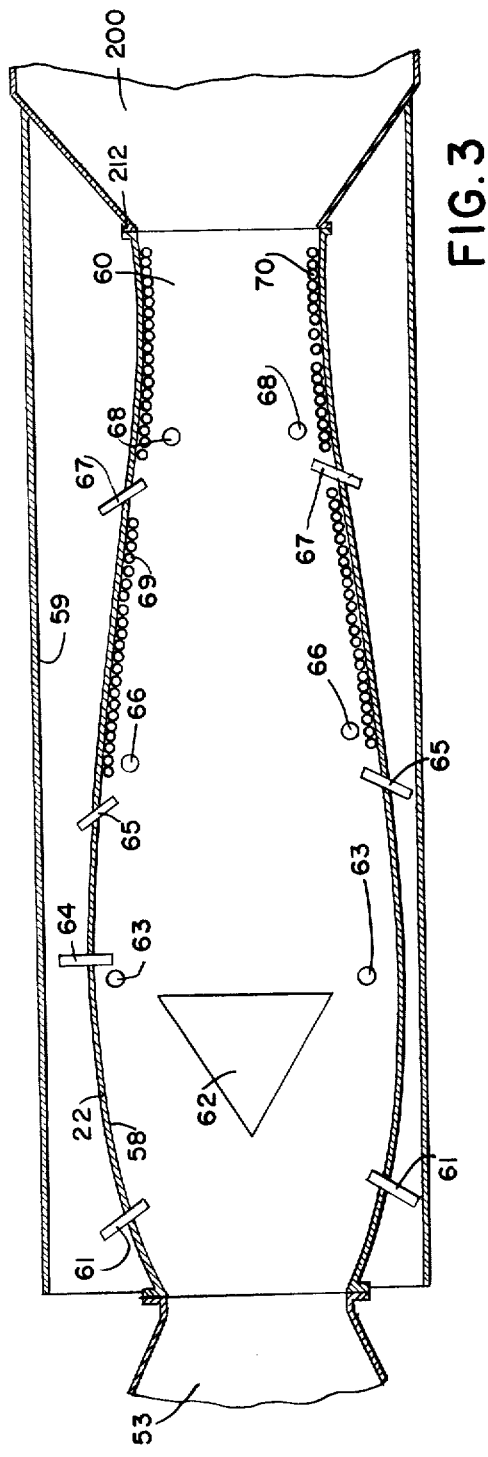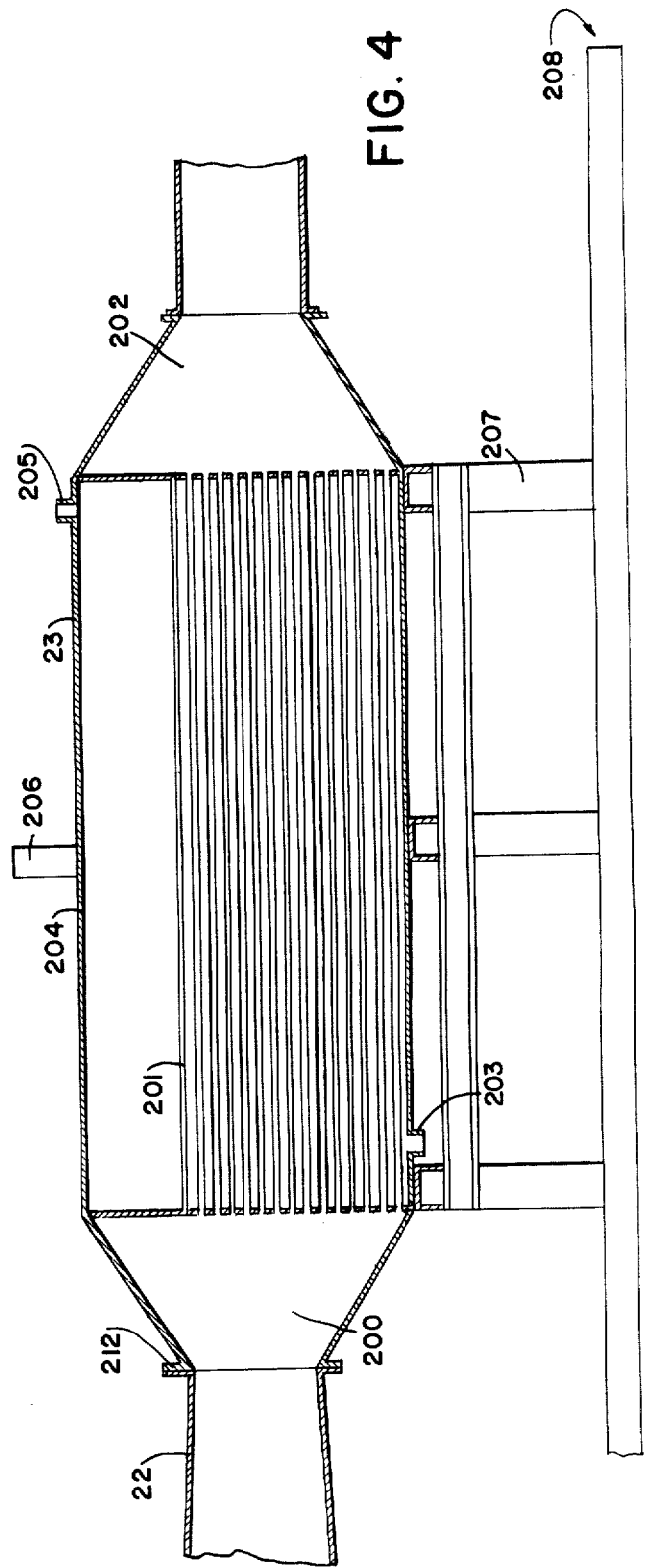

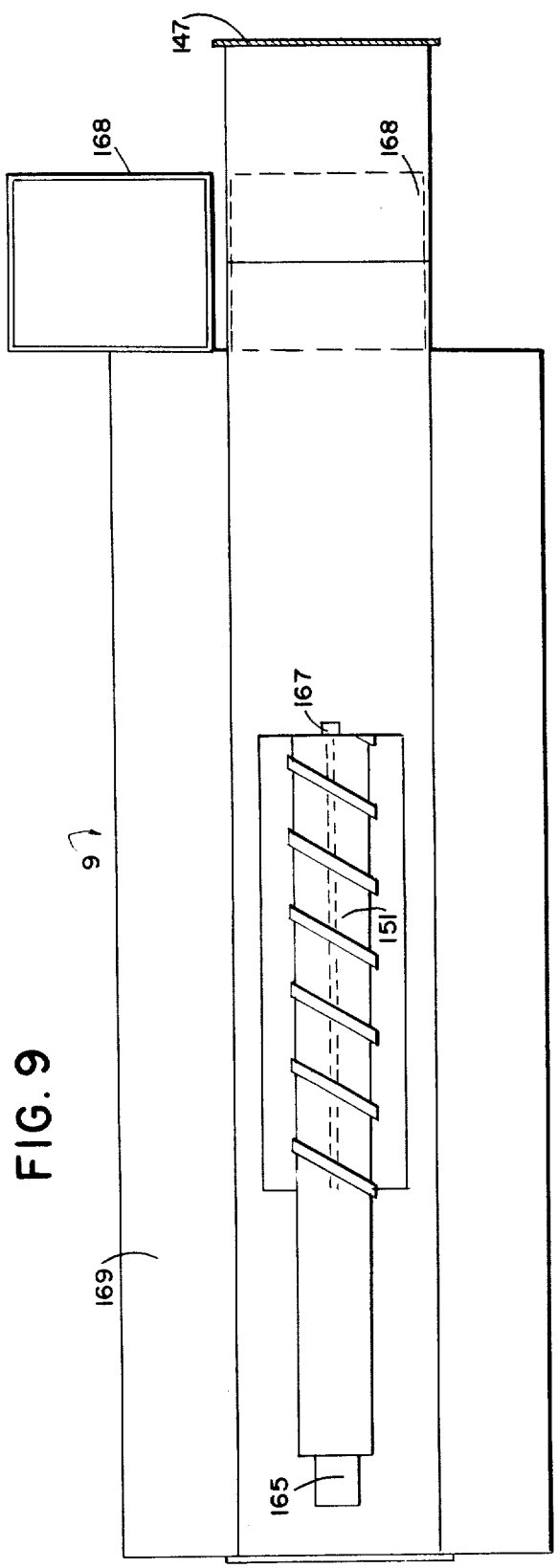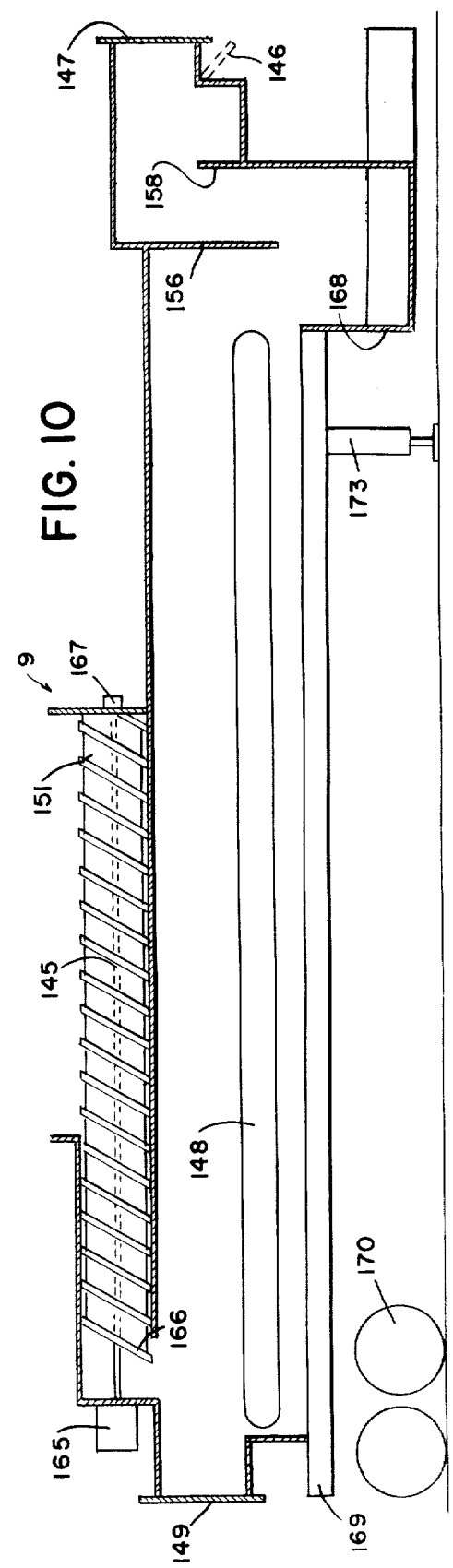

ENERGY RECOVERY SYSTEM

BACKGROUND OF THE INVENTION

The invention relates generally to metal recycling, electricity production and fuel production and more particularly has reference to a system that uses heat produced by incineration of waste materials to generate sufficient electrical power to refine the metals present in scrapped automobiles to a sufficient purity as to be marketable as either ingots or finished metal products.

A number of methods are currently available to process obsolete scrap. The easiest and most popular method is open burning. However, most obsolete scrap includes a variety of combustible materials such as plastics, grease and oil. Due to the expense and time in removing such materials prior to open burning, the scrap is commonly left intact. The result is visible, toxic pollution and smoke as the materials burn off during open burning. Such discharges do not meet most environmental standards. On the other hand, if the combustibles are left on the scrap and processed in a mill, the gases released in the steel refining process will be highly flammable and problems develop with burning electrostatic precipitators and bag house filters.

Presently available systems for recycling obsolete scrap involve many isolated steps.

A large amount of obsolete scrap cannot be recycled by presently available systems because the cost of transporting the scrap to the recycling plant exceeds the value of the scrap as a No. 2 or No. 1 bundle. For this reason, thousands of tons of steel never reenter the steel production cycle. As the cost of energy increases, this problem becomes even more acute.

The composition of presently available scrap bundles is so poorly monitored that steel manufacturers must treat all bundles as a very low quality grade of iron. The highly fragmented nature of the obsolete scrap industry makes highly differentiated bundles presently unavailable.

Strict pollution control legislation has virtually eliminated the small scale smelter. The cost of air pollution control is excessive in terms of the value of the recycled metal produced.

Metal recycling systems have been developed that are capable of producing a high grade of scrap metal. However, the cost of these systems is very high and is far beyond the financial resources of many scrap processors. These recycling systems are fixed-site systems and are feasible only in large urban environments where large amounts of scrap are available. Collections of obsolete scrap in remote locations are not economically feasible. This extreme centralization of existing metal recycling systems, as well as the very low price of processed scrap in relationship to the value of processed metal, has led to decreased use of obsolete scrap in steel production.

Some existing systems recycle metals as a component of a municipal waste incinerator system. Because of the very high temperatures encountered in the incinerator, however, the steel fuses with copper and aluminum present in the waste, making the recycled metal virtually useless.

Electricity has been produced using heat recovery from incinerators. The electricity is either used on-site or sold to surrounding industries. The electricity generated has never been used to process the obsolete scrap recovered by the incinerator.

Many problems exist in the currently available systems for recycling obsolete scrap. A large amount of obsolete scrap is never recycled because of the short radius of operation of existing obsolete scrap recovery systems. Existing scrap recovery systems are heavy consumers of energy.

The demand for a system capable of recycling different metals in obsolete scrap on a single site with equipment that is capable of being moved from one scrap collection to another.

SUMMARY OF THE INVENTION

The present invention overcomes many of the problems which exist in prior art systems. It provides an inexpensive and simply constructed system capable of recycling the steel, iron, aluminum, copper and lead present in obsolete scrap into ingots or finished products by using the heat released from a scrap-burning incinerator to provide electricity to power an electric furnace, as well as by using combustible and organic waste to provide additional energy to the scrap processing equipment, the entire device being capable of economically moving from one scrap collection to another.

In one embodiment, the energy recovery system of the present invention is located adjacent a large collection of obsolete scrap. The obsolete scrap is incinerated in a two-stage incinerator and crushed into bundles by a baler. The bundles are refined in an electric furnace and poured into steel ingots or usable parts. Preferably, the molten steel in the electric furnace is poured into an extruder and shaped into usable steel products.

In another embodiment, the aluminum in the obsolete scrap is collected and crushed into bundles by the baler. The aluminum is melted in the electric furnace and refined to the desired purity and poured into aluminum ingots or usable shapes.

In yet another embodiment, the copper in the obsolete scrap is collected and the combustibles attached are removed in the incinerator. The copper is then crushed into bundles in the baler. The bundles are loaded into the electric furnace and melted with an electric arc. After refining to the desired purity, the copper is either poured into ingots, cast into usable shapes or extruded into usable shapes.

In still another embodiment, the lead in the obsolete scrap is collected and combustibles are removed in the incinerator. The lead is then compressed into bundles by the baler. The lead bundles are loaded into the electric furnace and, after being refined to the desired purity, the molten lead is either cast into usable shapes, poured into ingots or extruded into usable shapes.

In another embodiment of the invention, a separate electric furnace is provided for each type of metal processed.

Waste oil is processed for use as a fuel or lubricating oil by using heat from the incinerator to vaporize the oil.

High quality heat is recovered from afterburner gases and used to power a turbo-generator system. The electricity produced is used to power all of the electrical equipment used in the system.

In particular, the electricity produced by the turbo-generator system is used to electrolyze water. The oxygen and hydrogen are compressed for use in oxyhydrogen welding or they are recycled in the system for use as fuel for the afterburner or oxygen for the electric furnace. The hydrogen may be used as a general industrial fuel. The oxygen can be used in conventional industrial applications.

Waste combustibles, such as wood and paper, are shredded and dried using low quality heat from the afterburner. The dried combustibles are burned in the incinerator to provide additional heat for the production of electricity. Where fly ash is a problem, the combustibles are compacted prior to drying.

Organic waste, such as spoiled fruit, is allowed to ferment. Low quality heat from the afterburner is used to distill the alcohol from the fermented organics. The alcohol is used as a gasoline or diesel oil substitute.

Objects of the invention are, therefore, to provide an improved system for the recovery of iron, steel, aluminum, copper and lead from obsolete scrap, to provide a system for the production of electricity from the heat produced by the incineration of obsolete scrap, to provide a system to use combustible waste to increase the amount of heat produced in the incinerator, to provide a system to recover fuel and oil from waste oil using heat produced by the incinerator to vaporize the waste oil, the waste oil being purified and separated according to distillate fractions by a cracking tower, to provide a system to distill fermented organic wastes to produce alcohol for use as a gasoline or diesel oil substitute, to further provide a scrubbing tower for cooling and scrubbing the gases emitted from the afterburner, and to further provide a bag-house filter for final purification of the afterburner gases prior to their release into the atmosphere.

Another object of the invention is to provide a heat collector downstream of a two-stage incinerator, means for circulating a working fluid through the heat collector to drive a turbine, an electricity generator for providing an electrical current, a condenser to return the working fluid to a liquid state, an electrical current control to provide the desired current, means to electrolyze water, a hydrogen compressor and hydrogen storage tank, an oxygen compressor and oxygen storage tank, electrical storage means, an electric arc furnace, metal casting and extruding devices adjacent the electric furnace, and means for returning the vapors released in the metal refining process to the primary burn area of the incinerator.

Still another object is to provide a combustibles dryer which uses the heat rejected by the heat collector to remove moisture from waste combustibles, a combustibles compactor for providing optimally dried combustibles shapes for incineration in the two-stage incinerator, a combustibles loader to transport the compacted combustibles to the two-stage incinerator, an ash compactor, and ash storage means adjacent to the ash compactor.

A further object is to provide a waste oil heater having a refluxing column, and liquid fuel and waste oil storage tanks.

Still another object is to provide tanks for the fermentation of organic hydrocarbons with a means to transport the fully fermented solution to a heating chamber and refluxing column to remove the alcohol, and a storage means for the alcohol.

Another object is to provide gas cooling and scrubbing means downstream of the heat collector, having a packed bed scrubber consisting of alternating layers of spray heads and packed beds, the construction of the device being such as to be able to resist both high and low temperature acid sollution attack, the gas being cooled sufficiently to direct it through a bag house filter, the purpose being the complete removal of all potentially toxic substances prior to the introduction of the gas stream into the atmosphere.

Yet another object is to provide flame guns in the afterburner that use hydrogen as a fuel. A further object is to provide the ability to change burners to allow for the use of alcohol, diesel oil, fuel oil, or waste oil in the burner, the burner consisting of a collar containing a variable sized orifice for the introduction of the fuel into the afterburner flow, a surrounding collar allowing compressed air to flow past the fuel orifice, and means to adjust the pressure and volume of the compressed air flowing through the burner.

A further object is to provide a forced draft fan outside the two-stage incinerator to force air into the primary burn area, the object being to force a substantial amount of air with a high static head through the two-stage incinerator, an additional fan being located downstream of the heat collection means, the fans being able to provide sufficient force to overcome the resistance of the gas flow through the entire energy recovery system.

Another object is to provide a refractory lining for the two-stage incinerator, the refractory lining being provided to minimize heat loss through the incinerator walls as well as to prevent corrosion.

An additional object is to circulate air between the inner skin and the outer skin of the incinerator, the preheated air then being injected into the primary combustion area through the refractory lining, the overfire air thereby accelerating the combustion rate in the two-stage incinerator, the flow of air being such that the heat otherwise lost through the refractory lining and inner skin is reintroduced into the primary combustion area of the two-stage incinerator.

Another object is to provide a rail system used to provide material circulation throughout the recycling site, the rail system consisting of two parallel rails with a third metal strip running between the rails, the purpose of the strip being to provide electrical power for material transportation carts, the carts being capable of moving and lifting heavy objects.

Another object is to provide a safe and efficient means for connecting all of the electrical components of the energy recovery system, the connections being designed for quick disconnection, the cable being adequate for above ground or below ground utilization.

These and other and further objects and features of the invention are apparent in the disclosure which includes the above and below specifications and claims and drawings.

BRIEF DESCRIPTION OF THE DRAWINGS

FIG. 2 is a sectional view of the primary burn chamber shown in FIG. 1.

FIG. 3 is a sectional view of the afterburner shown in FIG. 1.

FIG. 4 is a sectional view of the heat collector shown in FIG. 1.

FIG. 9 is a top plan view of the dryer shown in FIG. 1.

FIG. 10 is a sectional view of the dryer shown in FIGS. 1 and 9.

DETAILED DESCRIPTION OF THE DRAWINGS

Figure 1:
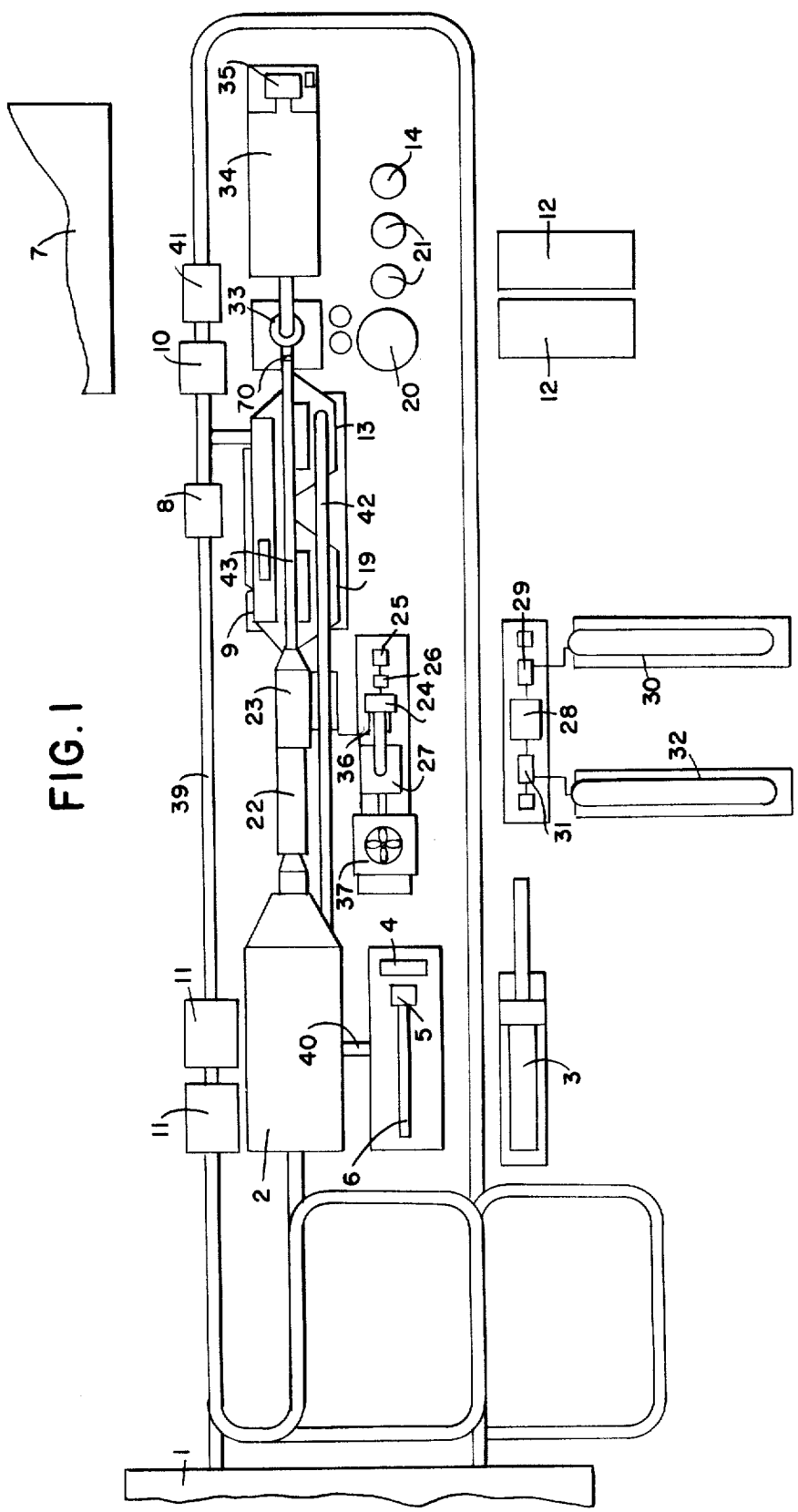
FIG. 1 is a simplified plan view of a recycling system incorporating the features of the present invention.

Overall system operation is best understood by reference to FIG. 1.

Scrap automobiles from a stockpile 1 are dismantled and loaded onto vehicle handling carts 11. The carts 11 move along parallel rails into a portable incinerator 2. The scrap autos are moved into the incinerator 2 and burned. After the combustibles have burned off of the automobiles, the hulks are removed from incinerator 2 and crushed into bundles by a baler 3. The bundles are then loaded into an electric furnace 4 where an electric arc is used to melt the bundles. When the bundles are molten, fluxes are used to remove impurities from the steel. After the steel has been refined to a desired purity, it is poured into an extruder 5. The molten steel is heated therein by an induction coil. A hydraulic ram forces the molten metal out of the extruder 5 through a water cooled die. The extruded steel cools off at a controlled rate on cooling rollers 6. The electric furnace 4, extruder 5 and cooling rollers 6 are enclosed, gases accumulating in the enclosures being vented into the incinerator 2 by the exhaust duct 40.

The gases produced by the incineration of the automobiles in the incinerator 2 are vented into an afterburner 22. A swirling flame is supported in the afterburner 22 by the tangential introduction of pre-heated combustion air immediately downstream of a flame stabilizing cone. A toroidal vortex immediately downstream of the flame stabilization cone further stabilizes the flame. Burners are used to heat the gases upstream of the flame and to insure that the flame does not blow out.

After the gases have passed through the afterburner 22, they pass through a heat collector 23. The heat collector 23 removes the high quality heat from the gas flow. The heat is used to generate steam in the heat collector 23. The steam is used to drive a turbine 24. The turbine 24 is drivingly connected to an electricity generator 25 by a transmission 26. The electricity produced by the generator 25 is used to power equipment in the system. A condenser 27 is used to remove heat rejected by the turbine 24 from the working fluid. Condensate collected in the condenser 27 is recirculated to the heat collector 23 by a feed water circulation pump 36. The condenser 27 is cooled by water that circulates through a cooling tower 37.

Electrical current produced by the generator 25 is used to electrolyze water in the electrolyzer 28. Oxygen produced in the electrolyzer 28 is compressed by the oxygen compressor 31 and stored in the oxygen storage tank 32. Hydrogen produced in the electrolyzer 28 is compressed by the hydrogen compressor 29 and stored in the hydrogen storage tank 30.

The heat produced by the incineration of automobiles contains sufficient energy to refine only ⅛th of the steel incinerated. For this reason, combustible waste, such as wood, paper, tree and lawn trimmings, and plastic items, that would otherwise be taken to a dump or a sanitary landfill is collected at an on-site storage area 7. The combustibles are shredded by a shredder 10 and loaded onto a transporter 8. The shredded combustibles are loaded into a dryer 9. Low quality heat rejected by the heat collector 23 is used to remove moisture from the combustibles in the dryer 9. The dried combustibles are then transported by rail to the incinerator 2. The dimensions of the transporter 8 are co-ordinated with the dimensions of the vehicle handling carts 11 so that both can fit in the incinerator 2 at the same time. The combustibles are burned in the incinerator 2 along with the scrap autos to produce additional heat and energy. Ash from the incinerated combustibles is transported to a sanitary landfill. If the composition of the combustibles is such that fly ash would be a problem, the combustibles are compacted in the portable compactor 41 prior to drying.

The disposal of waste oil from abandoned or scrapped automobiles is a problem faced by the automobile wrecker. For this reason, the system provides a waste oil cracking tower 19 that uses low quality heat rejected by the heat collector 23 to heat waste oil. As the volatile hydrocarbon constituents of the waste oil vaporize, they are vented, separated and condensed. The volatiles that do not condense are recirculated into the incinerator 2 by the cracking tower vent 42. The condensed volatiles are stored in fuel oil tanks 21. Waste oil is accumulated in a waste oil storage tank 20 prior to being placed in the cracking tower 19.

As diesel oil becomes unavailable, a source of synthetic oil is vital to the wrecking yard operator and scrap processor. For this reason, organic waste, such as spoiled fruit and vegetables and grain that is moldy or insect infested, that would otherwise be transported to a sanitary landfill is allowed to ferment in fermentation tanks 12. When the fermentation process is completed, the fermented organics are transferred to an alcohol still 13 where alcohol is distilled out. Low quality heat rejected by the heat collector 23 is used to heat the fermented organics to slightly above the boiling point of alcohol in the alcohol still 13. The distilled alcohol is removed from the still 13 and stored in alcohol storage tanks 14.

The gases leaving the heat collector 23 flow through the bypass duct 43, dryer 9, cracking tower 19 or alcohol still 13 into a scrubbing tower 33. The gases are therein cooled and scrubbed with a caustic spray to neutralize the HCL and other acids present. After passing through the scrubbing tower 33, the gases enter a bag-house filter 34. The particulates in the gases are removed by bag filters in the bag-house filter 34. An induced draft fan 35 overcomes the flow resistance of the bag-house filter 34. After passing through the induced draft fan 35, the gases are vented into the atmosphere.

The incinerator is best described in FIG. 2. Cars and combustibles are introduced into the incinerator 2 on the material handling carts 11. The cars and combustibles are moved into the primary burn area 38 and the door 15 is shut and sealed. Air is forced between the inner wall 45 and the outerwall 46 bounding the forward section of the primary burn area 38 by an air supply blower. That air is then introduced into the primary burn area 38 through the underfire air outlets 17 to support combustion in the primary burn area 38. Additional air is forced between the outer skin 48 and the refractory lining 18 by the overfire air supply blower 49. That air then enters the primary burn area 38 through the overfire air outlets 47. Heat for ignition of the automobiles and combustibles is provided by ignition burners 52 which have external fuel and air sources. The gases released by incineration of the automobiles and combustibles pass into the collector 51 and through the primary burn area outlet 53 to the afterburner 22.

The incinerator 2 is mounted on wheels 54. The front of the incinerator 2 is supported by a pedestal 55. A hook up for towing 56 is built into the forward subframe 57. As shown in FIG. 3, the products of incomplete combustion in the primary burn area 38 enter the afterburner 22 from the primary burn area outlet 53. The gases are heated by eight pre-heat burners 61 arranged in an annular row about the afterburner 22. The gases area forced into the annular space between the afterburner lining 58 and a flame stabilization cone 62 mounted in the afterburner flow path. Combustion air is introduced through the air injectors 63 to support a flame immediately downstream of the cone 62. A starting burner 64 is used to insure that the flame does not blow out. Secondary burners 65 and tertiary burners 67 are used to insure that the stack temperature is adequate. Secondary air injectors 66 and tertiary air injectors 68 are used to provide optimum combustion conditions downstream of the flame stabilizing cone. Air is supplied to secondary and tertiary air injectors 66 and 68 through air tubes 69 and 70 which are coiled along the inner surface of the afterburner 22. That arrangement allows the air to be heated by the hot gases passing through the afterburner 22. The combustion air is introduced tangentially to provide a swirling flow in the afterburner 22. The gases in the burn-out region 60 are fully oxydized and flow into the heat collector inlet 200. A heat retaining cover 59 surrounds the afterburner 22 to prevent heat loss.

A flange 212 at the inlet 200 of the heat collector 23 is connected to the outlet of the afterburner 22 as shown in FIG. 4. The afterburner gases received in the heat collector 23 are directed through firetubes 201. The firetubes 201 transfer heat from the gases to water contained in a boiler 204. As the temperature of the water increases, steam forms above the tubes 201 and is vented through a steam outlet 205. Water is added to the boiler 204 through a feed water inlet 203 to maintain a safe water level in the boiler 204. The upper firetubes 201 are not submerged, thereby superheating the steam. A safety valve 206 insures that steam pressure does not become excessive. The afterburner gases leave the boiler through an exhaust outlet 202. The boiler 204 is supported by a wheeled trailer 208. The height of the heat collector may be adjusted by heat collector mounts 207.

Figure 5:
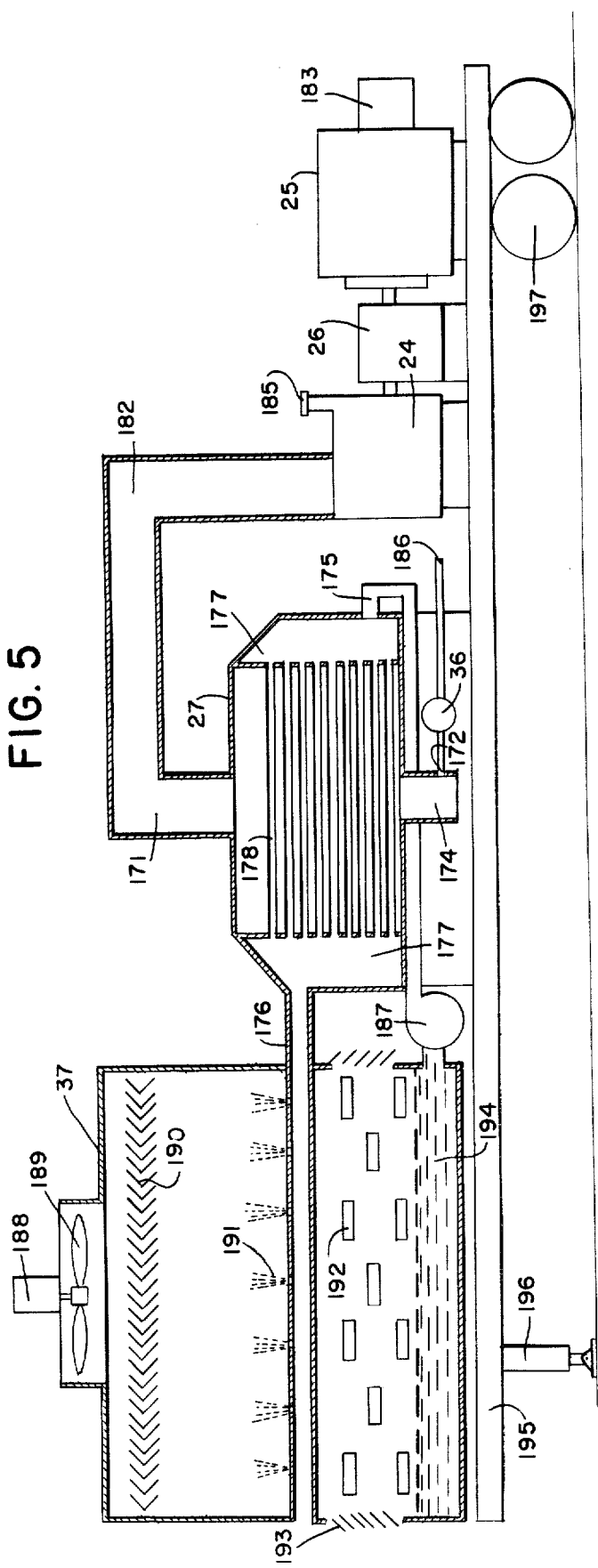
FIG. 5 is a sectional view of the condenser and cooling tower shown in FIG. 1.

The electrical power plant is described in detail in FIG. 5. High temperature and pressure steam from the heat collector 23 is channeled through a steam inlet 185 to the steam turbine 24. The turbine drives a generator 25. The generator is prevented from overspeeding by a governor 183. The speed of the turbine is reduced by the transmission 26.

Low pressure steam exhausted from the turbine is transmitted to the condenser 27 by a low pressure steam line 182. The steam enters the condenser 27 at a steam inlet 171 and is directed into contact with water circulation tubes 178. As the steam condenses, it falls into the hotwell 174. The condensate is removed from the hotwell 174 through the condensate outlet 172. The feed water circulation pump 36 pumps the condensate through return line 186 to the heat collector 23.

A water circulation pump 187 pumps cold water through the inlet pipe 175 to a water box 177. The water passes through the tubes 178 to the water return line 176. The water is sprayed into the cooling tower 37 by spray heads 191 and is caught on the baffles 190 and drops to the cooling water holding tank 194. Packing 192 insures that water loss is not excessive. An induced draft fan 189 driven by an electrical motor 188 provides air circulation in the cooling tower by drawing air through the inlet louvers 193.

The power plant is mounted on a trailer 195 provided with wheels 197. Pedestals 196 hold the front end of the trailer 195 in place while stationary.

Figure 6:
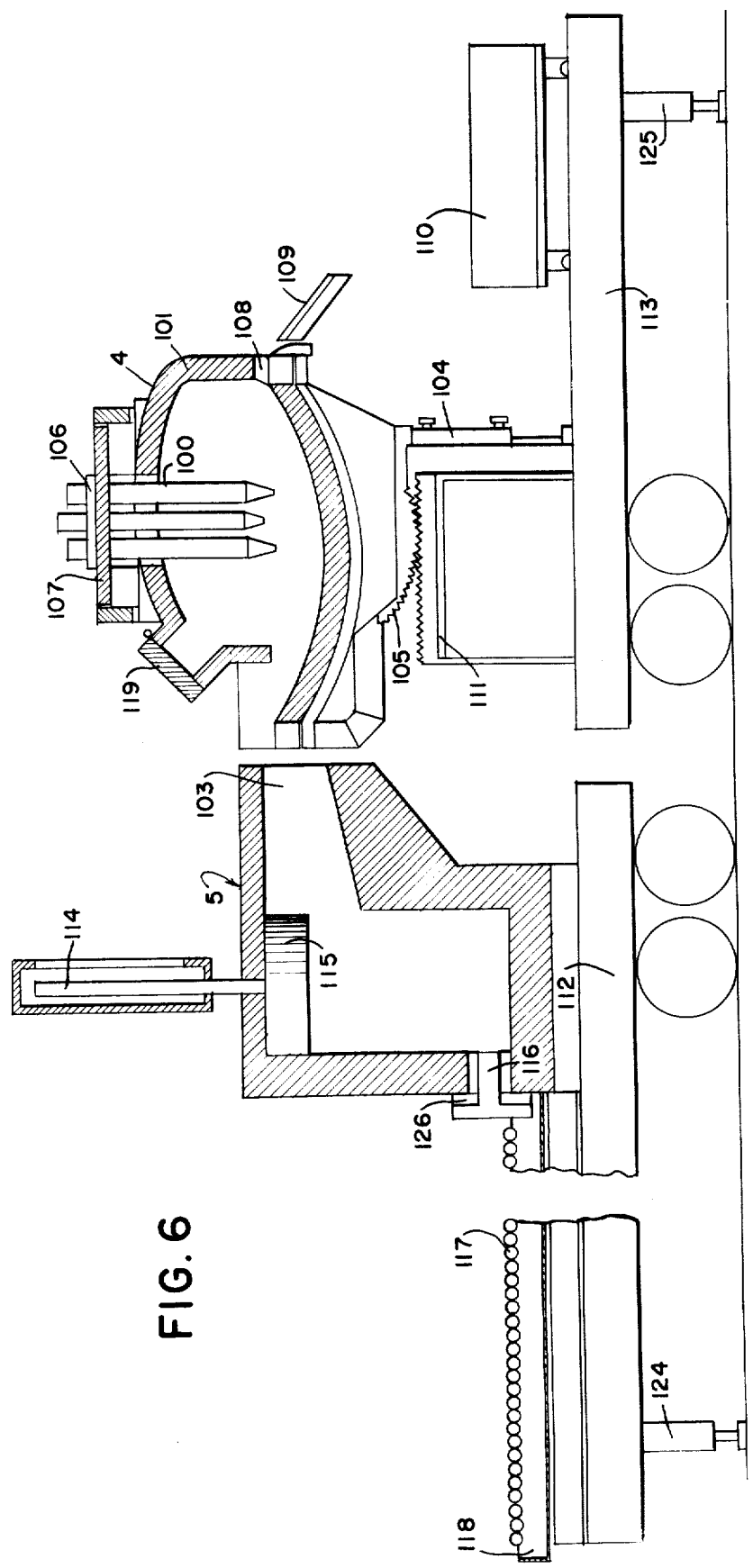
FIG. 6 is a sectional view of the furnace and extruder shown in FIG. 1.
Figure 7:
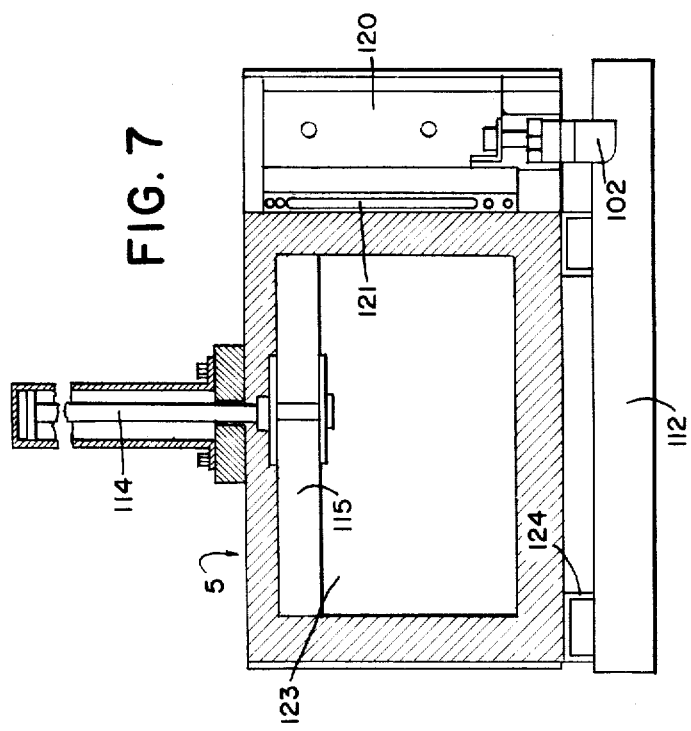
FIG. 7 is a sectional view of the extruder taken along the line 7—7 in FIG. 6.

The metal refining apparatus is best described in FIGS. 6 and 7. Steel bundles are loaded into the electric furnace 4 through the loading door 119. The furnace 4 is a conventional design. An arc is struck between the bundles and three electrodes 100. The position of the electrodes is controlled by fast action motors 106. A catwalk 107 is mounted on top of the furnace for inspection of the electrodes 100. Slag is drained from the molten steel through the slag outlet 108. The slag is directed into a holding cart 110 by the slag guide 109.

The tilt angle of the furnace 4 is controlled by a hydraulic ram 104 which rocks the furnace 4 on its longitudinal axis on a rocking gear 105 mounted on a support 111. After impurities have been fluxed out of the molten steel in the crucible 101, the crucible 101 is rocked forward and the molten metal is guided into the extruder inlet 103. When the extruder 5 is filled with molten steel, the hydraulic ram 114 forces the plunger 115 down to compress the molten metal. The metal is kept molten by an induction current coil 121. As the pressure on the molten metal increases, it is forced through the extruder die 116 to the desired shape. The extruded metal is cooled by a water jacket 126 surrounding the die 116. The extruded metal rests on water cooled rollers 117 which are partially submerged in water contained in a tray 118.

The electric furnace 4 and extruder 5 are mounted on wheeled trailers 112 and 113 provided with pedestals 124 and 125.

As shown in FIG. 7, the extruder 5 is supported by a metal framework 122 mounted on the wheeled trailer 112. A coil 121 connected to the extruder 5 induces a current in the molten metal in the extruder metal holding region 123. The coil 121 is held together by transite lumber 120. Knife contacts 102 are connected to a source of current and the coil 121 to selectively provide current to the coil 121. The hydraulic ram 114 presses the metal by forcing the plunger 115 toward the bottom of the extruder 5.

Although the refining apparatus was described with reference to steel, it is understood that the refining process and apparatus of the present invention are applicable to aluminum, copper, lead and other metals.

Figure 8:
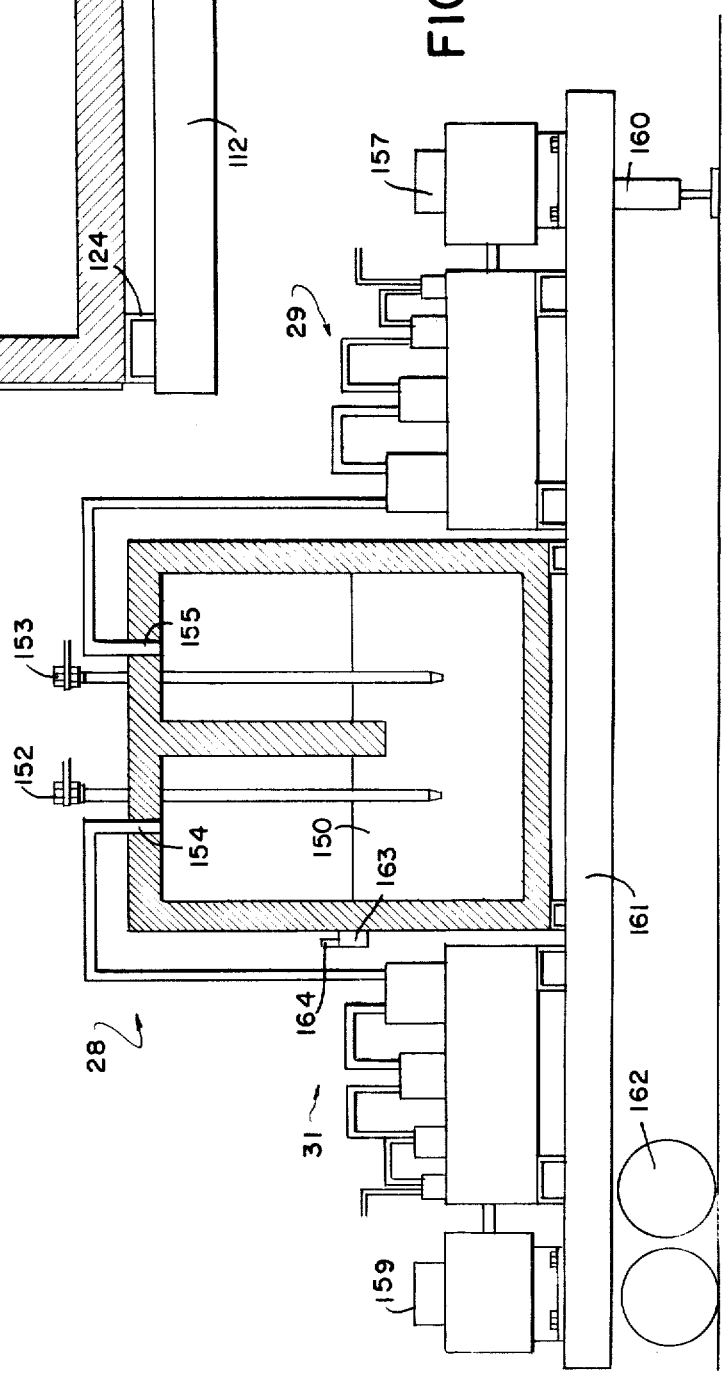
FIG. 8 is a sectional view of the electrolyzer shown in FIG. 1.

The electrolyzer is best shown in FIG. 8. Water is introduced into the holding tank 150 of the electrolyzer 28 through a water inlet 164. The water level in the tank 150 is controlled by a float valve 163. A current is run from a positive electrode 152 and a negative electrode 153 through the water. The current causes hydrogen to gather at the negative electrode 153. A vent 155 allows the hydrogen to be transferred to a compressor 29 which is driven by an electrical motor 157. The compressed hydrogen is stored in a large volume tank 30. The oxygen that collects around the positive electrode 152 is vented through the oxygen vent 154 and compressed by an oxygen compressor 31 driven by a motor 159. The oxygen is stored in a large volume tank 32.

The electrolyzer 28, compressors 29 and 31 and motors 157 and 159 are mounted on a trailer 161 which is supported by wheels 162. A pedestal 160 supports the front end of trailer 161.

FIGS. 9 and 10 best illustrate the dryer 9. Hot gases from the heat collector 23 are directed into a dryer inlet 149. The hot gases pass over a conveyor belt 148 and remove moisture from material on the conveyor 148. As the gases pass the end of the conveyor 148, they are forced through two baffles 156 and 158 to remove particles that may have been picked up during the pass over the conveyor 148. The gases exit the dryer 9 through a dryer outlet 147. A clean out panel 146 is provided for the region downstream of the second baffle 158.

Material to be dried is loaded into a hopper 151 positioned atop the dryer 9. An Archimedes screw 145 moves the material from the hopper 151 to an opening 166 above the conveyor 148. The material falls through the opening 166 onto the end of the conveyor 148. The rate at which material is loaded onto the conveyor is controlled by a screw drive motor 165. A bearing 167 supports the opposite ends of the screw 145.

As the material to be dried reaches the opposite end of the conveyor 148, it falls into a collection cart 168. A positive seal is maintained between the cart 168 and the dryer 9 to prevent excessive escape of gases. When the collection cart 168 becomes filled, the conveyor 148 is stopped, the cart 166 is removed, and an empty cart 168 is inserted. The drying process is then resumed.

The dryer 9 is mounted on a trailer 169 provided with wheels 170 and a pedestal 173.

Figure 11:
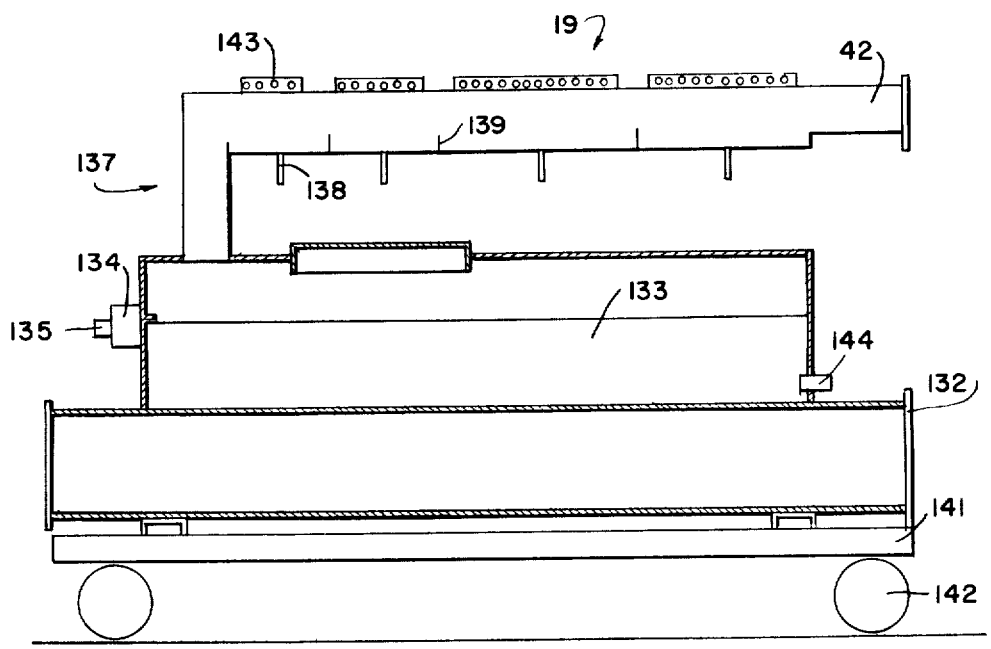
FIG. 11 is a sectional view of the cracking tower shown in FIG. 1.

Operation of the waste oil cracking tower 19 is described in detail in FIG. 11. Waste oil 133 is introduced into the cracking tower 19 through the oil inlet 135 and is maintained at a constant level by the float valve 134. After the oil 133 has been processed, it is drained out through the valve controlled outlet 144.

Hot air from the afterburner 22 is mixed with outside air to achieve a desired temperature and is then introduced into a heating chamber 132. After passing through the heating chamber 132, the gases are directed to the packed-bed scrubbing tower 33. The heating chamber 132 transfers heat to the oil 133.

As the temperature of the oil 133 increases, the more volatile components vaporize and enter a cracking tower 137. The vapors pass through condensing regions in the tower 137. The condensing regions are cooled by water jackets 143. As the temperature of the volatile hydrocarbon components decreases, they condense. The condensates are separated according to their condensing temperatures by dividers 139. The separated condensates are removed from the cracking tower 137 by drains 138. After volatiles have been removed from the gas stream in the cracking tower 137, the gas stream is directed into the incinerator 2 through an exhaust vent 42. The gas stream contains volatiles that failed to condense.

The cracking tower 19 is supported by a trailer chassis 141 which is supported by wheels 142 for road travel.

A tower of similar design is used to distill alcohol from fermented organics.

Figure 12:
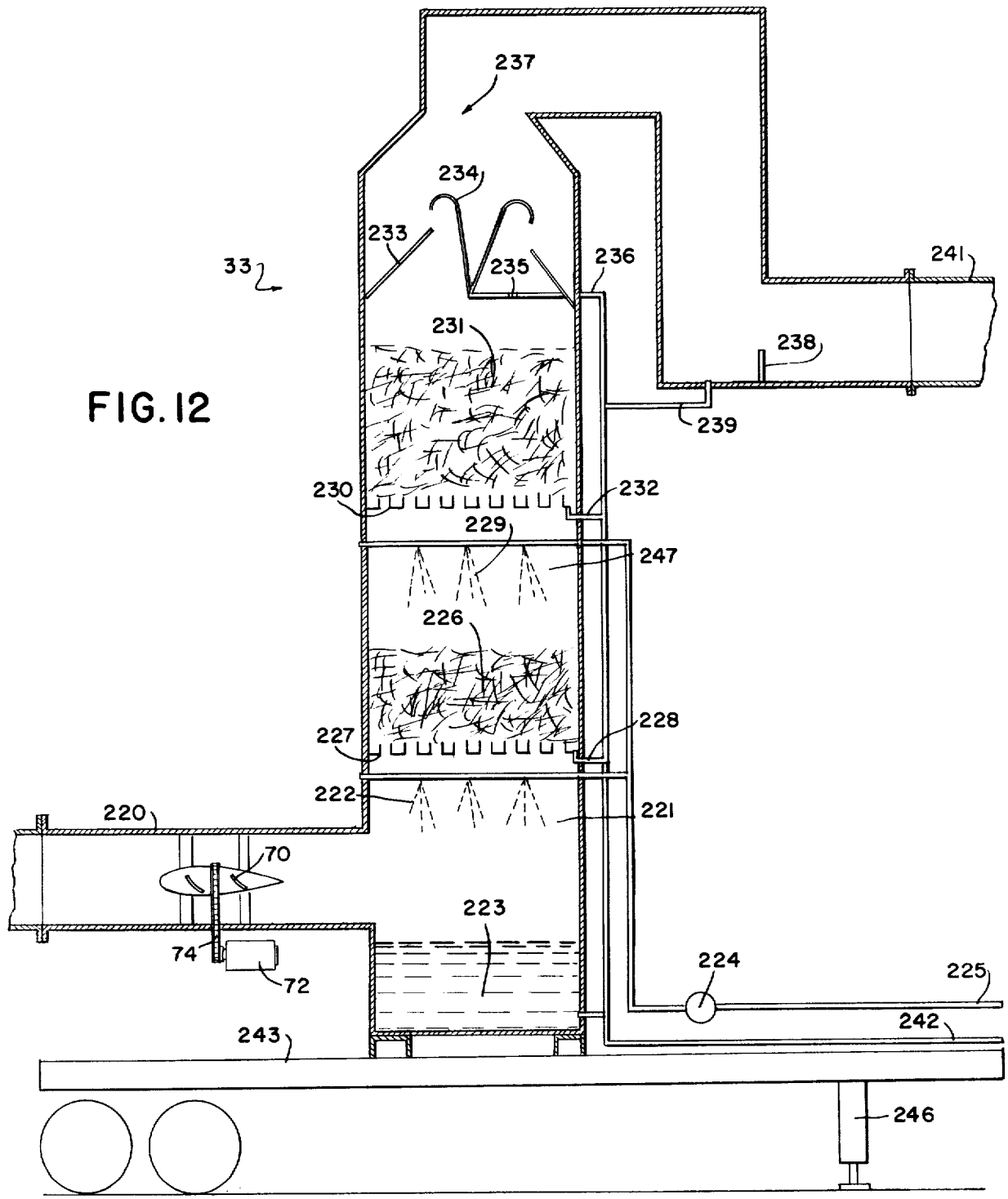
FIG. 12 is a sectional view of the scrubbing tower shown in FIG. 1.

The scrubbing tower is shown in FIG. 12. Hot gases from the heat collector 23, dryer 9, cracking tower 19, alcohol still 13 or bypass duct 43 enter the scrubbing tower 33 through a scrubbing tower inlet 220. The gases pass into a cooling chamber 221 where water is sprayed into the gases by spray heads 222. Water from the spray heads 222 collects in a spent liquor tank 223. The gases then pass thrugh a packed bed 226 where the majority of the water suspended in the gases is removed. The water is collected in the packed bed collection plate 227 and the water is removed from the plate 227 by the packed bed drain 228. The gases continue up the scrubbing tower 33 and enter the scrubbing chamber 247. A second set of spray heads 229 scrubs the cooled gases. The gases pass through the secondary packed bed collection plate 230 into the secondary packed bed 231. Moisture removed from the gas stream in the secondary packed bed is removed by the secondary packed bed drain 232. The cooled and scrubbed gases pass through the water recovery baffles 233 and 234 and pass through the scrubbing tower outlet 237. The gases pass a final moisture recovery baffle 238 and enter the bag house filter inlet 241. Moisture removed from the gas stream by the baffles 233, 234 and 238 is removed by drains 235, 236 and 239. The spent liquor and recovered water are carried to holding tanks by a spent liquor drain outlet 242. Make-up water is introduced through the spray heads 222 and 229 and by a make-up water circulation pump 224. Additional water is provided through a make-up water inlet 225.

A two-stage fan 70 positioned in the inlet 220 assists gas flow. An electric motor 72 is drivingly connected to the fan 70 by a chain drive 74.

The scrubbing tower 33 is mounted on a wheeled trailer 243. A pedestal 246 supports the front end of the trailer 243 while stationary.

Figure 13:
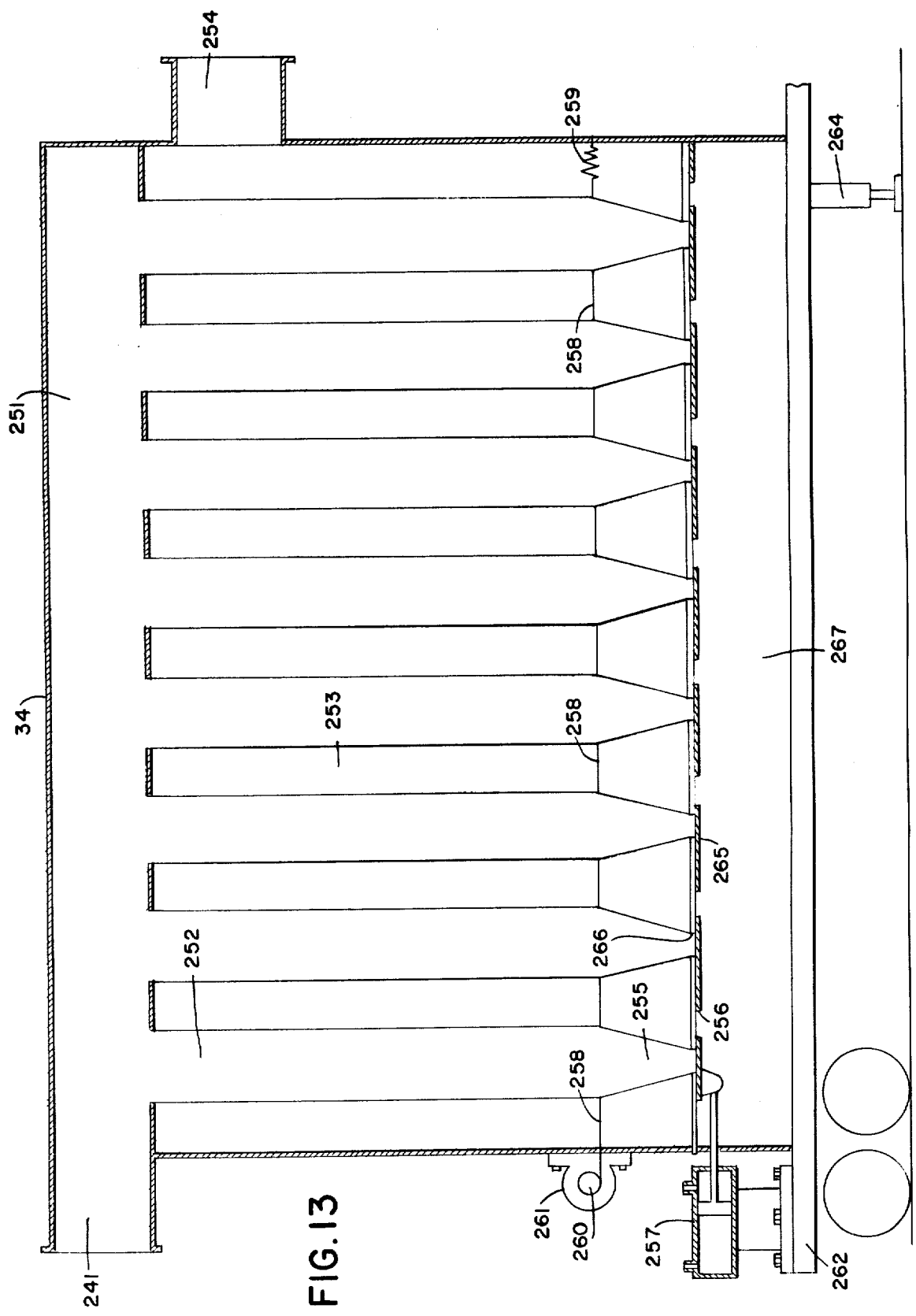
FIG. 13 is a sectional view of the bag house filter shown in FIG. 1.

As shown in FIG. 13, cooled and scrubbed gases from the scrubbing tower 33 enter the bag house filter inlet 241. The gases enter a plenum 251 above rows of cloth bag filters 252. The gases enter the filters 252 and pass through the filters 252 and into inter-filter spaces 253. The gases then escape into the atmosphere through a bag house filter outlet 254.

Particulates in the gases cling to the inner walls of the filters 252. A cable 258 connected to a spring 259 at one end and an eccentric 260 at the other end is used to send shock waves through the bag filters 252 to dislodge particulates. As the particulates are dislodged from the inner walls of the filters 252, they gather in particulate collection areas 255. When the dislodged particulates fill the particulate collection areas 255, a hydraulic piston 257 moves a bottom seal 265 so that the bag filter cleanout openings 256 line up with the openings 266 at the bottom of the bag filters 252. The eccentric 260 is driven at a rapid speed by an electrical motor 261 to assist in the settling of the particulates in the bag filters 252. Dislodged particulates accumulate in the filtered particulate holding area 267 which is cleaned out periodically as necessary.

The bag house filter 34 is mounted on a wheeled trailer 262. The front end of the trailer is held up by a pedestal 264 when stationary.

While the invention has been described with reference to specific embodiments, the exact nature and scope of the invention is defined in the following claims.

We claim:

1. Energy recovery system comprising
   an incinerator configured to burn scrap material comprising metal,
   afterburner means connected to the incinerator for oxidizing products of incomplete combustion from the incinerator,
   heat collection means connected to the afterburner for converting thermal energy contained in the oxidized products into steam,
   electricity producing means connected to the heat collection means for converting the steam into electric current, and
   metal refining means for refining metal from the incinerated scrap material, said refining means being powered solely by electrical current produced by the electricity producing means.

2. The system of claim 1 wherein the metal refining means comprises an electric arc furnace.

3. The system of claim 1 wherein the metal refining means comprises
   a furnace configured to receive the incinerated scrap material, said furnace being provided with means for melting said received material and means for fluxing impurities from said molten material thereby refining molten metal in said material,
   an extruder for shaping the refined metal, said extruder comprising a ram configured to force molten metal through a shaping die, and
   cooling means for controllably cooling metal from the extruder.

4. The system of claim 3 further comprising
   enclosure means about said furnace, extruder and cooling means for accumulating gases produced during operation of said furnace, extruder and cooling means, and
   conduit means connected to the enclosure means and the incinerator for communicating gases from said enclosure means to said incinerator.

5. The system of claim 3 wherein the cooling means comprises
   rollers positioned adjacent the extruder to recieve metal forced through the die,
   a tray positioned beneath said rollers, and
   water coolant supplied to the tray, said rollers being partially submerged in said water coolant.

6. The system of claim 1 further comprising baling means for compressing the incinerated scrap material.

7. The system of claim 3 wherein the furnace is provided with outlet means in an upper wall portion, said outlet means being configured to discharge refined metal when said furnace is tilted to a selected orientation, and the extruder is provided with intake means positioned adjacent the outlet means and configured to receive the discharged metal, and further comprising tilting means connected to the furnace to selectively tilt the furnace to a desired orientation.

8. The system of claim 7 wherein the tilting means comprises
   a support positioned beneath the furnace,
   a first rocking gear connected to an upper surface of the support and oriented in the direction of said outlet means,
   a second rocking gear connected to the lower surface of the furnace and meshingly engaging the first rocking gear, and
   a ram connected to the furnace to rock said furnace with respect to said support.

9. The system of claim 3 wherein the furnace, the extruder and the cooling means are each provided with movable supports.

10. The system of claim 1 further comprising
    electrolysis means for electrolyzing water to thereby produde hydrogen gas and oxygen gas, said electrolysis means being powered solely by electrical current produced by the electricity producing means.

11. The system of claim 10 further comprising
    first storage means connected to the electrolysis means for storing hydrogen gas produced by said electrolysis means, and
    second storage means connected to the electrolysis means for storing oxygen gas produced by said electrolysis means.

12. The system of claim 10 further comprising means for movably supporting said electrolysis means.

13. The system of claim 1 further comprising
    fermentation tanks configured to receive organic waste material and to ferment received material,
    distillation means for heating fermented material to distill alcohol therefrom, and
    heat conduit means connected to the afterburner means and the distillation means for communicating thermal energy from the afterburner means to the distillation means, said thermal energy being the sole source of operating heat provided to said distillation means.

14. The system of claim 13 further comprising alcohol storage tanks for storing the alcohol produced by the distillation means.

15. The system of claim 13 further comprising means for movably supporting said distillation means.

16. The system of claim 1 further comprising
    oil cracking means for heating waste oil and breaking up said oil into relatively lighter hydrocarbon compounds, and
    heat conduit means connected to the afterburner means and the oil cracking means for communicating thermal energy from the afterburner means to the oil cracking means, said thermal energy being the sole source of operating heat provided to said oil cracking means.

17. The system of claim 16 further comprising means for movably supporting said oil cracking means.

18. The system of claim 16 wherein said oil cracking means comprises
    a waste oil storage chamber,
    a heat chamber adjacent said storage chamber for receiving said thermal energy from said afterburner means and heating waste oil contained in the chamber, thereby vaporizing volatile hydrocarbon components of said oil, and
    a cracking tower connected to an upper surface of the storage chamber for receiving vapor from the oil storage chamber and separating and condensing volatile hydrocarbon components of said vapor.

19. The system of claim 18 wherein the cracking tower comprises
    an elongated vapor conduit for receiving said vapor,
    cooling means connected to the outer surface of said vapor conduit at spaced locations to form condensing regions in said vapor conduit for condensing selected volatile hydrocarbon components of vapor in said vapor conduit,
    dividers positioned in the vapor conduit between said condensing regions, said dividers being configured to permit vapor flow through said vapor conduit and to separate volatile hydrocarbon components condensed out of said vapor, and openings provided in the conduit in said condensing regions to permit removal of said condensed volatile components from said vapor conduit.

20. The system of claim 19 further comprising exhaust vapor conduit means connected to the incinerator and an exhaust opening provided in the vapor conduit for communicating exhaust vapor from said vapor conduit to said incinerator, said exhaust vapor comprising volatile hydrocarbon components of said oil.

21. The system of claim 1 further comprising a shredder for shredding combustible waste material, a dryer for drying the shredded material, and heat conduit means connected to the dryer and the afterburner means for communicating hot gases from the afterburner means to the dryer, said hot gases being the sole source of drying heat for said dryer.

22. The system of claim 21 further comprising transport means connected to the dryer and the incinerator for transporting the dried material from the dryer to the incinerator, said material being burned in the incinerator with said scrap material.

23. The system of claim 21 wherein the dryer comprises a drying chamber having an inlet for receiving gases from the heat conduit means and an outlet spaced from said inlet for expelling gases, a conveyor positioned in the drying chamber for moving said shredded material through said drying chamber, said conveyor having one end adjacent said inlet and a remote end adjacent said outlet, baffle means positioned in the drying chamber between the outlet and the end of the conveyor adjacent the outlet to form a tortuous path between said outlet and said end of said conveyor, said path being sufficiently tortious to remove particulate matter from said gases flowing therethrough, and feed means connected to the drying chamber for controllably feeding shredded material onto the end of the conveyor adjacent the inlet.

24. The system of claim 23 wherein the feed means comprises a container configured to hold shredded material, an Archimedes screw connected to the container and to the drying chamber in the vicinity of an opening formed in a surface above the conveyor, and drive means connected to the screw to impart controlled rotation to said screw, said screw being arranged to convey material from said container to said opening when said screw is rotated.

25. The system of claim 23 further comprising collecting means removably connected to the drying chamber in the vicinity of the end of the conveyor adjacent the outlet for receiving dried material discharged from said end of said conveyor.

26. The system of claim 21 further comprising means for movably supporting said dryer.

27. The system of claim 21 further comprising compacting means for compacting said shredded material.

28. The system of claim 1 wherein the electricity producing means comprises a steam turbine, steam conduit means connected to the turbine and the heat collection means for communicating steam from said heat collection means to said turbine, and an electric generator operatively connected to said turbine.

29. The system of claim 28 further comprising condenser means for condensing low pressure steam, exhaust steam conduit means connected to the turbine and the condenser means for communicating steam exhausted by the turbine to the condenser means, and condensate conduit means connected to the condenser means and the heat collection means for communicating condensate from the condenser means to the heat collection means.

30. The system of claim 29 wherein the condenser means comprises a cooling chamber having an inlet for receiving exhaust steam from the turbine, water circulation tubes positioned in the cooling chamber in the path of the exhaust steam entering the chamber through the inlet, a cooling tower having a water holding tank, walls adjacent said tank being provided with openings, a fan mounted in an opening formed in a wall above said tank for circulating air through said tower, and baffles positioned between said tank and said fan, and water spray means connected to the water circulating tubes and the cooling tower for spraying water from said tubes onto said baffles, and pump means connected to the cooling tower and the tubes for pumping water from said water tank through said tubes.

31. The system of claim 29 further comprising means for movably supporting said condenser means.

32. The system of claim 1 further comprising scrubbing means for neutralizing acids in gases from the afterburner means, and gas conduit means connected to the afterburner means and the scrubbing means for communicating gases from the afterburner means to the scrubbing means.

33. The system of claim 32 wherein the scrubbing means comprises a gas inlet chamber connected to the gas conduit, a tower connected to the gas inlet chamber, said tower being provided with first spray means positioned above the gas inlet chamber for directing water coolant into said chamber, a first packed bed positioned above the first spray means for removing water from cooled gases, second spray means positioned above the first packed bed for scrubbing gases passed through said first packed bed with a caustic spray, a second packed bed positioned above the second spray means for removing moisture from scrubbed gases, baffle means positioned above the second packed bed forming a tortuous path, said path being sufficiently tortuous to remove moisture from the gases passing therethrough.

34. The system of claim 33 wherein the cooling tower is further provided with a first collection plate between said first packed bed and said first spray means and a second collection plate between said second packed bed and said second spray means, said first and second collection plates collecting moisture removed by said first and said second packed beds respectively.

35. The system of claim 33 further comprising
a tank connected to the tower to receive spent moisture from said first and second spray means.

36. The system of claim 32 further comprising means for movably supporting the scrubbing means.

37. The system of claim 32 further comprising
gas outlet means connected to the tower for expelling gas from the tower, and
baffle means positioned in the gas outlet means for removing moisture from gases passing through said gas outlet means.

38. The system of claim 1 further comprising
filter means for removing particulate matter from gases from the afterburner means, and
gas conduit means connected to the afterburner means and the filter means for communicating gases from the afterburner means to the filter means.

39. The system of claim 38 wherein the filter means comprises a bag house filter.

40. The system of claim 38 further comprising means for movably supporting the filter means.

41. The system of claim 38 wherein the filter means comprises
a gas inlet for receiving gases from the afterburner means,
a filter chamber connected to the gas inlet, said filter chamber being provided with spaced gas-permeable filter elements having open upper ends configured to receive gases from the gas inlet,
a particulate chamber positioned beneath lower open ends of the filter elements,
seal means for selectively covering said openings in said lower open ends,
agitation means for selectively agitating said filter elements to dislodge particulate matter entrapped therein, and
a gas outlet in communication with outer surfaces of said filter elements for exhausting gases permeating through said filter elements.

42. The system of claim 41 wherein the agitation means comprises
a motor connected to a first wall of the filter chamber,
an eccentric operatively driven by the motor, and
a cable having an end connected to the eccentric and a remote end connected to a spring mounted on a second wall of the filter chamber remote from said first wall, said cable being positioned to agitate said filter elements upon operation of said eccentric.

43. The system of 41 wherein the seal means comprises
a plate movably mounted in the filter chamber against the lower open ends of the filter elements, said plate being provided with spaced openings, and
a ram connected to the plate for translating the plate in a plane perpendicular to the axis of said filter elements, thereby aligning the openings in the plate with the openings in the lower ends of the filter elements.

44. The system of claim 1 wherein the incinerator comprises
a primary burn chamber having material holding means positioned in a lower portion thereof for receiving said scrap material,
first air outlets positioned beneath the material holding means for injecting air into the primary burn chamber in an upward direction,
second air outlets positioned above the material holding means for injecting air into the primary burn chamber in a downward direction,
ignition burners positioned in the vicinity of the metal holding means for igniting said scrap material, and
exhaust means connected to the upper portion of the primary burn chamber for exhausting products of incomplete combustion from the primary burn chamber.

45. The system of claim 1 further comprising means for movably mounting said incinerator.

46. The system of claim 1 wherein the afterburner means comprises
a conduit having a first end connected to the incinerator for receiving products of incomplete combustion from the incinerator,
a second end remote from the first open end for exhausting gases from the conduit, said conduit being configured to provide a flow path for gases from the first open end to the second open end,
first heating means connected to the conduit for directing heat into the flow path adjacent the first open end,
a conical body positioned concentrically within the conduit downstream of the first heating means, said body having a vortex presented toward the first open end and a base having a diameter less than the diameter of the conduit portion coplanar therewith thereby forming an annular space between the base and the conduit,
first air injectors connected to the conduit for providing air to the interior of the conduit in close downstream proximity to said annular space, said injectors directing air tangentially to the flow path,
second heating means connected to the conduit for directing heat into the flow path downstream of the first air injectors, and
second air injectors connected to the conduit for providing air into the interior of the conduit in close downstream proximity to said second heating means, and 47. The system of claim 46 further comprising air conduit means having a first end connected to the second air injectors and a second end connected to a source of pressurized air, a portion of said air conduit means intermediate said ends being coiled about said flow path to communicate thermal energy from the flow path to air in the air conduit means.

48. The system of claim 46 further comprising
third heating means connected to the conduit for directing heat into the flow path downstream of the second air adjusters,
third air injectors connected to the conduit for providing air to the interior of the conduit in close downstream proximity to said third heating means, and
air conduit means having ends connected to the second and third air injectors and ends connected to a source of pressurized air, portions of said air conduit means intermediate said ends being coiled about said flow path to communicate thermal energy from the flow path to air in the air conduit means.

49. The system of claim 46 wherein the first and second heating means each comprise a plurality of burners arranged in an annular row about the conduit, each burner oriented to direct heat inwardly and forwardly with respect to the flow path.

50. The system of claim 46 wherein the conduit tapers from the portion coplanar with the base toward the first open end and toward the second open end.

51. The system of claim 46 further comprising
a burner connected to the conduit for directing heat into the flow path in close downstream proximity to said first air injectors.

52. The system of claim 46 further comprising heat retaining means concentrically spaced about said conduit for restricting radial escape of thermal energy from said conduit.

53. The system of claim 1 wherein the heat collection means comprises
a steam chamber having an inlet connected to the afterburner means for receiving gases and thermal energy from said afterburner and an outlet for exhausting said gases from said steam chamber,
an array of tubular conduits positioned in the steam chamber between said inlet and said outlet providing a flow path from the inlet to the outlet, said array being partially submerged in water contained in the steam chamber for communicating thermal energy from the flow path to the water and being spaced from the upper end of said steam chamber to permit collection of superheated steam above said array, and
a steam outlet connected to the upper end of the steam chamber for exhausting steam from the chamber.

54. The system of claim 1 further comprising means for movably supporting the heat collection means.

55. The system of claim 1 further comprising
material holding means for movably supporting said scrap material, and
guide means connected to the material holding means and the incinerator for guiding said material holding means into the interior of said incinerator.

56. The system of claim 55 wherein the material holding means comprises a flat support member mounted on wheel assemblies and the guide means comprises rails configured to engage said wheel assemblies.

57. The system of claim 1 further comprising
electrolysis means for electrolyzing water to thereby produce hydrogen gas and oxygen gas, said electrolysis means being powered solely by electrical current produced by the electricity producing means,
fermentation tanks configured to receive organic waste material and to ferment the received material,
distillation means for heating the fermented material to distill alcohol therefrom,
heat conduit means connected to the afterburner means and the distillation means for communicating thermal energy from the afterburner means to the distillation means, said thermal energy being the sole source of operating heat provided to said distillation means,
oil cracking means for heating waste oil and breaking up said oil into relatively lighter hydrocarbon compounds,
said heat conduit means being further connected to the oil cracking means for communicating thermal energy from the afterburner means to the oil cracking means, said thermal energy being the sole source of operating heat provided to said oil cracking means,
exhaust vapor conduit means connected to the incinerator and the oil cracking means for communicating exhaust vapor from said oil cracking means to said incinerator, said exhaust vapor comprising volatile hydrocarbon components of said oil,
a shredder for shredding combustible waste material,
said heat conduit means being further connected to the dryer for communicating hot gases from the afterburner means to the dryer,
said hot gases being the sole source of drying heat for said dryer,
transport means connected to the dryer and the incinerator for transporting dried material from the dryer to the incinerator, said material being burned in the incinerator with said scrap material,
scrubbing means for neutralizing acids in gases from the afterburner,
said heat conduit means being further connected to the scrubbing means for communicating gases to the scrubbing means,
filter means for removing particulate matter from gases from the afterburner, and
said heat conduit means being further connected to the filter means for communicating gases to the filter means.

58. A method for energy recovery comprising
incinerating scrap material comprising metal,
oxidizing products of incomplete combustion produced by incineration,
collecting heat contained in the oxidized products,
converting the collected heat into steam,
converting the steam into electrical current, and
refining metal from the incinerated scrap material using power provided solely by electrical current produced from the steam.

59. The method of claim 58 further comprising electrolyzing water solely with electric current produced by the steam.

60. The method of claim 58 further comprising
fermenting organic waste material, and
heating the fermented waste material solely with heat contained in said oxidized products to distill alcohol from the fermented material.

61. The method of claim 58 further comprising heating waste oil solely with heat contained in said oxidized products to break up said oil into relatively lighter hydrocarbon compounds.

62. The method of claim 61 further comprising
vaporizing volatile hydrocarbon components of said waste oil, and
burning said vaporized volatile components with said scrap material to generate additional heat in said oxidized products.

63. The method of claim 58 further comprising
shredding combustible waste material,
drying the shredded material, and
incinerating the shredded material with the scrap material to generate additional heat in said oxidized products.

64. The method of claim 58 further comprising
neutralizing acids in hot gases produced during incineration.

65. The method of claim 58 further comprising removing particulate matter from gases produced during incineration.

66. The method of claim 58 further comprising
electrolyzing water solely with electric current produced by the steam, fermenting organic waste material, heating the fermented material solely with heat contained in said oxidized products, to distill alcohol from the fermented material, heating waste oil solely with heat contained in said oxidized products to break up said oil into relatively lighter hydrocarbon compounds, vaporizing volatile hydrocarbon components of said waste oil, burning said vaporized volatile components with said scrap material to generate additional heat in said oxidized products, shredding combustible waste material, drying the shredded waste material, incinerating the shredded material with the scrap material to generate additional heat in said oxidized products, neutralizing acids in gases produced during incineration, and removing particulate matter from gases produced during incineration.

* * * * *